United States Patent
Fisher et al.

(12) 
(10) Patent No.: US 6,899,630 B2
(45) Date of Patent: May 31, 2005

(54) UNIVERSAL JOINT YOKE ADAPTER

(75) Inventors: Timothy Fisher, Alexandria, MN (US); Marvin Hoffman, Alexandria, MN (US)

(73) Assignee: Bigelow Group, Boulder, CO (US)

( * ) Notice: Subject to any disclaimer, the term of this patent is extended or adjusted under 35 U.S.C. 154(b) by 0 days.

(21) Appl. No.: 10/396,737

(22) Filed: Mar. 25, 2003

(65) Prior Publication Data

US 2004/0192447 A1 Sep. 30, 2004

(51) Int. Cl.$^7$ .............................. F16D 3/26; F16D 3/50
(52) U.S. Cl. ...................................... 464/125; 464/134
(58) Field of Search ................................ 464/125, 134, 464/135, 905

(56) References Cited

U.S. PATENT DOCUMENTS

| | | | | |
|---|---|---|---|---|
| 1,183,143 A | * | 5/1916 | Van Dyke ..................... | 464/125 |
| 1,255,792 A | * | 2/1918 | Rhoads ........................ | 464/125 |
| 4,192,153 A | | 3/1980 | Fisher ........................... | 64/17 |
| 4,334,415 A | * | 6/1982 | Hopkins et al. .............. | 464/130 |
| 4,881,924 A | | 11/1989 | Gall .............................. | 464/134 |
| 5,094,651 A | | 3/1992 | Cornay ......................... | 464/12 |
| 5,277,659 A | | 1/1994 | Cornay ......................... | 464/12 |
| 5,425,676 A | | 6/1995 | Cornay ......................... | 464/11 |
| 5,823,881 A | | 10/1998 | Cornay ......................... | 464/118 |
| 6,251,020 B1 | | 6/2001 | Cornay ......................... | 464/117 |

* cited by examiner

*Primary Examiner*—K. Thompson
(74) *Attorney, Agent, or Firm*—Marsh Fischmann & Breyfogle LLP

(57) ABSTRACT

The present invention is directed to an adapter for converting a yoke, which was originally designed to receive a torque transfer element between opposing surfaces, into a yoke designed to be received with an annular member of a ring-type universal joint. In this regard, cruciform-type universal joints may be readily replaced with ring-type universal joints. In a first embodiment, the adapter provides a first interface surface for engaging a yoke member that at least partially defines first and second opposing radial bores and a second interface surface for pivotal interconnection within an aperture of a ring-type universal joint. The first and second interface surfaces may be formed in multiple sizes to allow variously formed yoke members to be converted for use with a ring-type universal joint.

27 Claims, 7 Drawing Sheets

UNIVERSAL JOINT YOKE ADAPTER

FIELD OF THE INVENTION

The present invention relates to universal joint structures for transferring rotary motion and associated torque from a first shaft to a second shaft while permitting relative movement therebetween. More particularly, the present invention is directed to an adapter yoke that allows a ring-type universal joint to be utilized with a yoke originally designed for use with a cruciform-type universal joint.

BACKGROUND

Rotating shafts are commonly utilized to transmit mechanical energy between power sources and power outputs. In many instances, a power source and output cannot be accurately aligned, or, these components move relative to one another during operation. In this regard, separate shafts may be connected to each component while the shafts are interconnected with a universal joint capable of transmitting rotation therebetween while the shafts are not coaxially aligned.

A common universal joint utilized to interconnect shafts for rotation is a cruciform-type universal joint. This cruciform-type joint includes a pair of U-shaped members (i.e., yokes) with their midpoints attached to the end of first and second shafts. The open ends of the two U-shaped yokes are positioned in a facing relationship and rotated 90° relative to one another. A cruciform connecting member including four radially extending torque bearing elements extends between the legs of each U-shaped yoke. Each radially extending torque-bearing element typically includes a coaxially aligned cap, which is lined with bearings. Accordingly, when two opposing torque bearing elements are interconnected to the legs of a U-shaped yoke, a pivotal connection is formed between the cruciform member and the U-shaped yoke.

The internal connection of two facing U-shaped yokes by the cruciform connecting member limits the range of movement between the rotational axes of two interconnected shafts. Further, as the angle between the rotational axes of the two shafts increases there is a loss of rotational efficiency between the shafts resulting in undesirable vibration. This vibration may lead to increased joint wear and shortened component life. Additionally, when subject to high loads, the cruciform connecting member is susceptible to cracking between adjacent ones of the torque bearing elements due to high stress concentrations.

SUMMARY OF THE INVENTION

The present invention is based partially upon the realization that a less commonly utilized universal joint assembly, a ring-type joint, alleviates many of the problems associated with cruciform-type joints. Like cruciform type joints, ring-type joints are utilized to pivotally interconnect yoke members (e.g., U-shaped) attached to the ends of first and second shafts. However, as opposed to utilizing a connecting member that extends between the open ends of the yokes, the ring-type joint utilizes an annular connecting member that surrounds the yoke members and receives torque transfer elements that extend radially outward from the yokes. Due to their annular geometry, ring-type universal joints allow for an increased range of movement between the rotational axes of two interconnected shafts while reducing vibration. Additionally, ring-type joints eliminate the stress concentration problem associated with cruciform-type joints allowing for increased load transfer between interconnected shafts.

The inventors have realized that systems utilizing cruciform-type universal joints are typically designed to be within an acceptable operating range for the cruciform joint(s), however, the operating environments for such systems may change. For example, automotive driveline assemblies may utilize one or more cruciform joints to interconnect the transmission of the automobile (i.e., power output) to an output shaft (i.e., driveline), which may in turn be connected to a transfer case (i.e., differential), or, another shaft. Accordingly, changes to the suspension of the vehicle caused by, inter alia, worn springs, revisions to driveline components, stretching or shortening the chassis and/or raising or lowering the vehicle, may result in an increased angle between the output shaft and the other connected components. This increased angle may be near or outside the acceptable operating range of the cruciform joint(s) potentially causing decreased joint performance and/or shortened joint life. Accordingly, in such instances it may be desirable to replace the cruciform joint assembly with a ring joint assembly.

According to a first aspect of the present invention, an adapter is provided for converting a yoke, which was originally designed to receive a torque transfer element between opposing surfaces, into a yoke designed to be received with an annular member of a ring-type universal joint. In this regard, cruciform-type universal joints may be readily replaced with ring-type universal joints. The adapter includes a first structure for connection with a yoke member that is attached or attachable to a rotating member (e.g., a shaft, power input, power output or hub). This yoke member will at least partially define first and second opposing radial bores. In this regard, the first structure is adapted to engage a yoke member originally designed to receive opposing torque transfer elements (e.g. dual trunnions or cruciform-type connectors) in a pivotable manner. The adapter further includes a second structure for receipt within an aperture of an annular member of a ring-type universal joint. The second structure allows for pivotally interconnecting the adapter to the annular member of a ring-type universal joint. Accordingly, this annular member may be pivotally interconnected to a second rotating member, thereby connecting of the first and second rotating members with a ring-type universal joint.

The first and second structures of the adapter are rigidly interconnected such that rotation of the first structure (i.e., when interconnected to the yoke member) causes like rotation in the second structure. However, the first and second structures may be separately formed pieces. As will be appreciated, separately forming the first and second structures may allow added flexibility in interconnecting a plurality of differently sized yokes to a plurality of different sized ring-type universal joints. Alternatively, the first and second structures may be an integrally formed one-piece unit. In any case, the first and second structures will typically be centered about a common axis of rotation for balance purposes. Furthermore, upon interconnection of the first structure to an existing yoke member, the common axis of rotation will typically be aligned with the axis of rotation of the yoke member.

As used herein, the term "yoke member" is meant to include devices that at least partially define first and second opposing radial bores for receiving opposing torque transfer elements (e.g., opposing trunnions on a cruciform connector) and which are interconnected or interconnectable to rotary members. In this regard, the yoke member may comprise an end yoke (i.e., pinion yoke), a slip yoke, a flanged yoke, or a center yoke utilized in constant velocity joint assembly. Furthermore, the term yoke member is meant to include split yoke members having first and second opposing radial bores that contain removable cap members, as well as yoke members that have first and second radial bores integrally defined within their structure.

The first structure provides an interface surface for attachment to a yoke member that may be attached to a rotating member. As will be appreciated, yoke members come in different sizes for transferring rotary power between rotating members. For example, cruciform-type universal joints that utilize two opposing yoke members interconnected by a cruciform connector come in a variety of sizes. In this regard, the distance between opposing torque transfer elements as well as the diameter of these elements on the cruciform connectors vary depending upon the strength requirements of their intended application. Likewise, the yoke members that engage these cruciform connectors vary in size. In this regard, the interface surface of the first structure may be adapted to engage a variety of differently-sized yoke members. Alternatively, the first interface surface may be formed in a variety of different sizes to engage different sized yoke members.

The first structure is typically adapted to engage the existing yoke member such that it is fixedly interconnected thereto. That is, the first structure may be interconnected to the yoke member such that there is no relative movement between the adapter and the yoke member during rotation (i.e., the adapter and yoke member maintain a fixed positional relationship). Though it will be appreciated that in some instances a pivotal relationship may exist between these components. Furthermore, the first structure may be interconnected to the yoke member in any appropriate manner including, without limitation, utilizing removable mechanical fasteners (e.g., bolts, screws) as well as permanent affixing means such as welding or riveting. In a preferred embodiment, the first structure attaches to the yoke member utilizing the same connection mechanism utilized to hold a torque transfer element within the opposing bores of the yoke member. For example, the first structure may be bolted to existing threaded holds within the yoke member.

To enhance torque transfer between the yoke member and the adapter, the first structure may further include one or more torque transfer elements sized for receipt within the opposing radial bores at least partially defined by the yoke member. For example, when interfacing with a split yoke member that defines one-half of first and second opposing radial bores, two torque transfer elements on the first structure may comprise half cylindrical elements. Preferably, these torque transfer elements are integrally formed with the first structure to allow for increased load carrying ability. Accordingly, depending upon the yoke member that the torque transfer elements on the first structure they are to engage, the size of those torque transfer elements may be varied. In this regard, the length, width, diameter, etc. of the torque transfer elements may be sized for mating receipt within opposing radial bores at least partially defined by the yoke.

Once interconnected to the yoke member, the second structure may be received within and interconnected to an annular member of a ring joint assembly. In this regard, the second interface structure provides a surface adapted for pivotal interconnection with the annular member. This surface may receive torque transfer elements (e.g. pins or trunnions) extending inward from the annular member, or, this surface may incorporate outward extending torque transfer elements for receipt by the ring member. As will be appreciated, the structure receiving the torque transfer elements may include one or more bearing assemblies to create a pivotal relationship between the adapter and the annular member.

In one embodiment, the second structure comprises a yoke having first and second spaced members that extend substantially parallel to the axis of rotation of the adapter. These first and second members form opposing surfaces or ears that are received within the aperture of the annular member. Additionally, these ears provide opposing surfaces for pivotal interconnection with the annular member. In this regard, the first and second ears may receive torque transfer elements (e.g., cylindrical trunnions) extending inward from the ring member. Accordingly, the first and second ears may define first and second apertures for receiving the circular trunnions from the ring member. Alternatively, the apertures on the first and second ears may be threaded, allowing a trunnion to be threaded therein such that it extends radially outward and is received within the annular member. What is important is, the first and second ears are pivotally interconnectable with the annular member. In an alternate embodiment, the second structure may be a solid member aligned with the rotational axis of the adapter. In this regard, the solid member may include an aperture for receiving a pin which passes through opposing surfaces of the annular member.

In a further embodiment of the first aspect, the adapter includes a bore aligned with its rotational axis for receiving a structure extending through the aperture of the annular member. Such structures are knows in the art to align, center and/or fix the angle between rotating members interconnected by a ring type joint. This bore may extend entirely through the adapter or may extend a limited distance into the adapter. In any case, an open end of the bore will be accessible such that alignment, centering, or affixation means extending through the annular member of the ring-type joint can be received within the bore. To facilitate rotation of such a structure disposed within the bore, the bore may be sized to house bearing assemblies and/or bushings.

According to a second aspect of the present invention, a universal joint connector is provided that allows for the replacement of a cruciform joint assembly utilized to interconnect first and second rotating members. The connector comprises first and second yoke members that are disposed within and pivotally interconnected to an annular member. The first and second yoke members each contain an interface surface, which is further connectable to one of the first and second rotating members. In particular, one of the yoke members is interconnectable to an existing yoke (i.e., a third yoke attached to one of the rotating members), which at least partially defines opposing radial bores for receiving a torque transfer element therebetween (e.g., a cross trunnion or a cruciform connector). The other yoke member may be interconnectable to a shaft, or, a fourth yoke member attached to the other rotating member. The annular member forms a continuous wall around the first and second yoke members and is pivotally interconnected to those members about first and second pivot axes, which are typically co-planar and perpendicular, though this need not be the case.

The interface surfaces of the first and second yoke members are adapted for a fixed attachment to their respective rotating members. That is, upon interconnection to their respective rotating members, each yoke maintains a fixed spatial relationship with that member during rotation.

Accordingly, misalignment between these rotating members is accounted for by the pivotal interconnection of the two yoke members by the ring member.

According to another aspect of the present invention, a method for replacing a universal joint assembly interconnecting two rotating members in provided. In particular a method is provided for replacing a universal joint, which utilizes a torque transfer element pivotally interconnected between opposing radial bores of a yoke member, with a ring-type universal joint. Initially, the torque transfer element is removed from the opposing radial bores of the yoke member. This may entail removing retaining bolts, snap rings, or other mechanical fasteners. After the torque transfer element is removed from the yoke member, a first interface surface of an adapter member is attached to the yoke member. Once interconnected to the yoke member, a second interface surface of the adapter may be disposed within the aperture of an annular member of a ring-type universal joint. This second interface surface may be pivotally interconnected to opposing surfaces of the annular member about a first pivot axis. As will be appreciated, a second rotating member may then be interconnected to the annular member about a second pivot axis. In this regard, a yoke originally designed for receiving a torque transfer element (e.g., cruciform connector) between opposing radial bores may be converted into a yoke that may be utilized with a universal ring-type joint. Accordingly, the original universal joint may be replaced with a ring-type universal joint.

Attaching the adapter to the existing yoke member may further include disposing protruding elements formed on the first interface surface of the adapter into the opposing radial bores which are at least partially defined by the yoke member. In this regard, these protruding elements (e.g., trunnions) may be utilized to align the adapter with the yoke member. More preferably, these protruding elements are matingly engaged with the opposing radial bores, thereby guaranteeing alignment of the adapter with the yoke as well as allowing for increased torque transfer therebetween during operation of the joint. Once aligned, the adapter may be fixedly attached to the yoke member. Preferably, the adapter is attached utilizing the attachment mechanisms that connected the torque transfer element to the yoke member, though this need not be the case.

Once the adapter is interconnected to the yoke and the second interface surface is interconnected to the annular member, the annular member may be further interconnected to a second rotating member. For example, the annular member may be interconnected to a rotating shaft or to another yoke member originally designed to receive a torque transfer element between opposing radial bores. In the case where the annular member is interconnected to a shaft, the method may further include interconnecting a yoke member to the end of the shaft (e.g., welding) and disposing the yoke member within the aperture defined by the annular member. In any case, upon competing the steps of said method, a universal joint originally designed to receive the torque transfer member between opposing radial bores of a yoke member may be replaced by a ring type universal joint, allowing for increased motion and/or torque transfer between rotating members

DETAILED DESCRIPTION

The present invention is directed towards universal joints utilized for transferring rotary motion from a first rotating member to a second rotating member (e.g., first and second rotating shafts) while permitting relative movement between the rotational axes of the first and second members. Particularly, the present invention is directed towards an adapter that converts a yoke designed for use with a cruciform-type universal joint into a yoke designed for use with a ring-type universal joint. This allows for replacement of a cruciform-type universal joint with ring-type universal joint, thereby providing, inter alia, an increased range of movement between the rotational axes of two interconnected rotating members, reduced vibration between the members, as well as the ability to transmit increased loads between the members. In the following description, one embodiment of the invention is set forth in the context of replacing a cruciform-type universal joint assembly in an automotive drive linkage with a ring-type universal joint assembly. It will be appreciated, however, that certain aspects of the invention are not limited to such applications.

Figure 1:
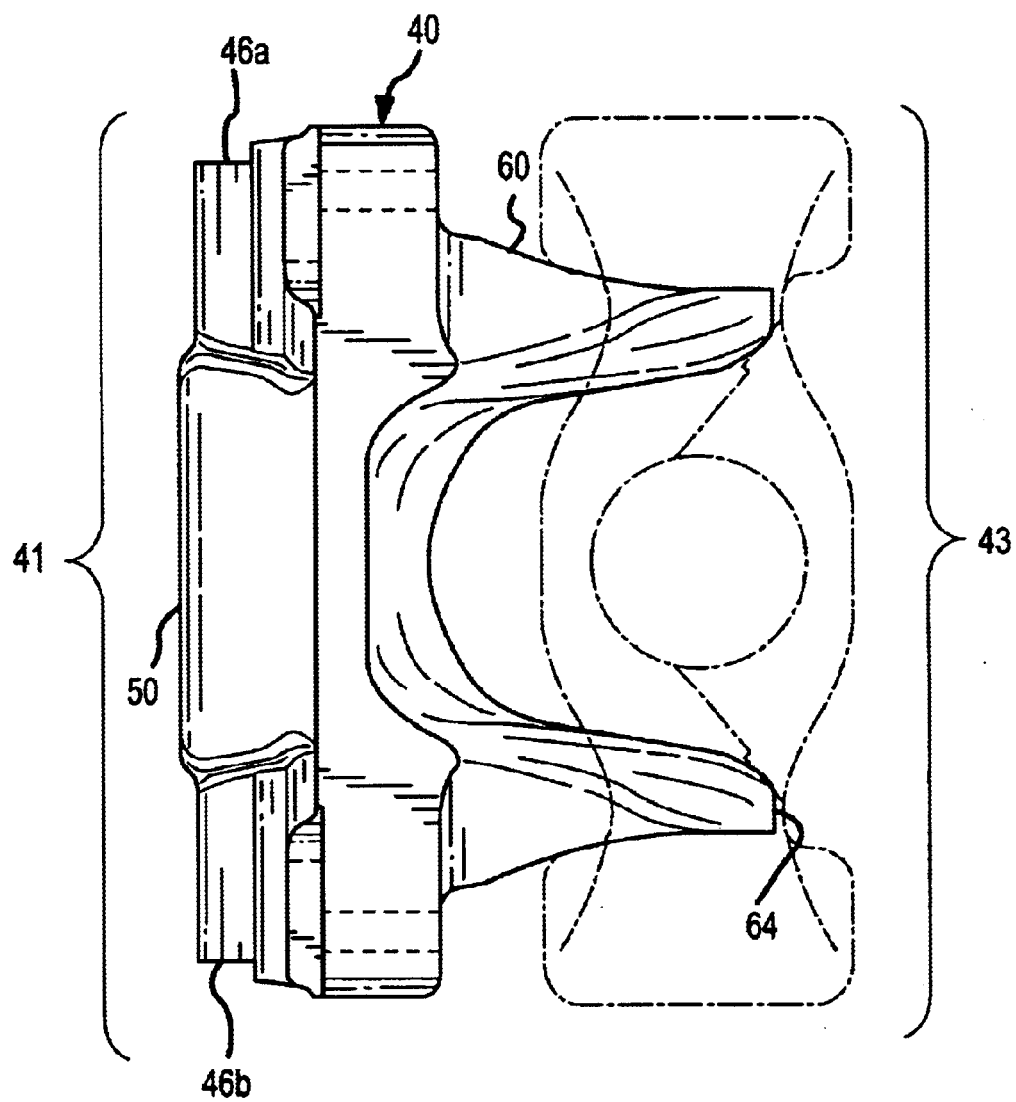
FIG. 1, shows a side view of an adapter of the present invention.

FIG. 1 shows a side view of the adapter 40 of the present invention. As shown, the adapter 40 has a first interface surface 41 that is designed to engage a yoke member interconnected to a rotating member. This yoke member may be interconnected to a power output, a power input, a shaft, a hub, or any other member that rotates to transfer power. In any case, the yoke member is originally designed to receive opposing torque transfer elements (e.g. trunnions) typically on a cruciform connector, as will be more fully discussed herein. An opposing second interface surface 43 is designed to be received within a ring member of a ring joint assembly. In this regard, the adapter allows a yoke member designed for use with a cruciform connector to be converted for use with a ring-type yoke.

Figure 2:
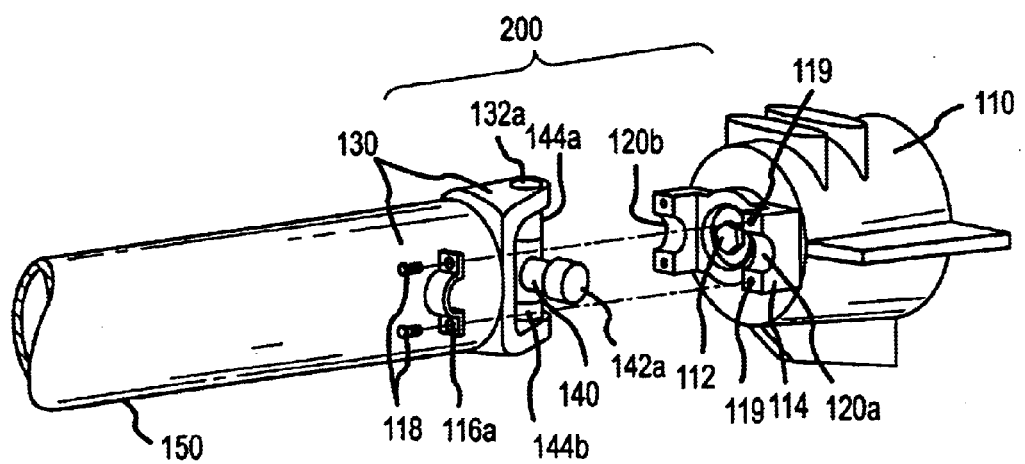
FIG. 2 shows a cruciform joint assembly.

FIG. 2, shows a cruciform joint assembly 200 for transmitting rotary power from a transmission 110 of an automobile to an output shaft 150 (e.g. a drive line). As shown, the cruciform joint assembly 200 includes a cruciform connector 140 having four radially-extending torque transfer elements, each of which is covered by a coaxially aligned bearing cap. A first set of opposing torque transfer elements 142a–b (only one shown) on the cruciform connector 140 are interconnectable to an output yoke 114, which is attached to the transmission 110 via a splined hub bolt assembly 112. As shown, the opposing torque transfer elements 142a–b are sized for receipt in two opposing radial bores 120a–b partially defined by the output yoke 114. When assembled, two interconnection bolts 118 are engaged with two mating threaded holes 119 on the output yoke 114 to securely affix each retaining cap 116a–b to corresponding radial bores 120a–b on the output yoke 114. Accordingly, once the retaining caps 116 are bolted to the output yoke 114, the torque transfer elements 142a–b of the cruciform connector 140 are secured within the opposing bores 120a–b.

A second set of opposing torque transfer elements 144a–b on the cruciform member connector 140 are connected to a generally U-shaped yoke 130 that is interconnected to the end of the output shaft 150. The U-shaped yoke 130 includes first and second opposing bores 132a–b (only one shown) for receiving the second set of opposing torque transfer elements 144a–b. As shown, the opposing torque transfer elements 144a–b are press fit within the opposing bores 132a–b on yoke 130.

Typically, the operating angle between the transmission 110 and output shaft 150 is designed to be within an acceptable limit for the cruciform joint assembly 200. However, changes to the suspension of the vehicle caused by worn springs, revisions to driveline components, stretching or shortening the chassis and/or raising or lowering the vehicle, may result in an increased angle between the output shaft 150 and the transmission 110. Accordingly, the cruciform joint assembly 200 may experience increased stresses and/or decreased performance. In this regard, an increased angle between the output shaft 150 and the transmission 110 may result in a shortened operating life for the cruciform connector 140. Accordingly, in some instances it may be desirable to replace the joint assembly 200 with a ring joint assembly having a greater allowable range of motion.

Figure 3:
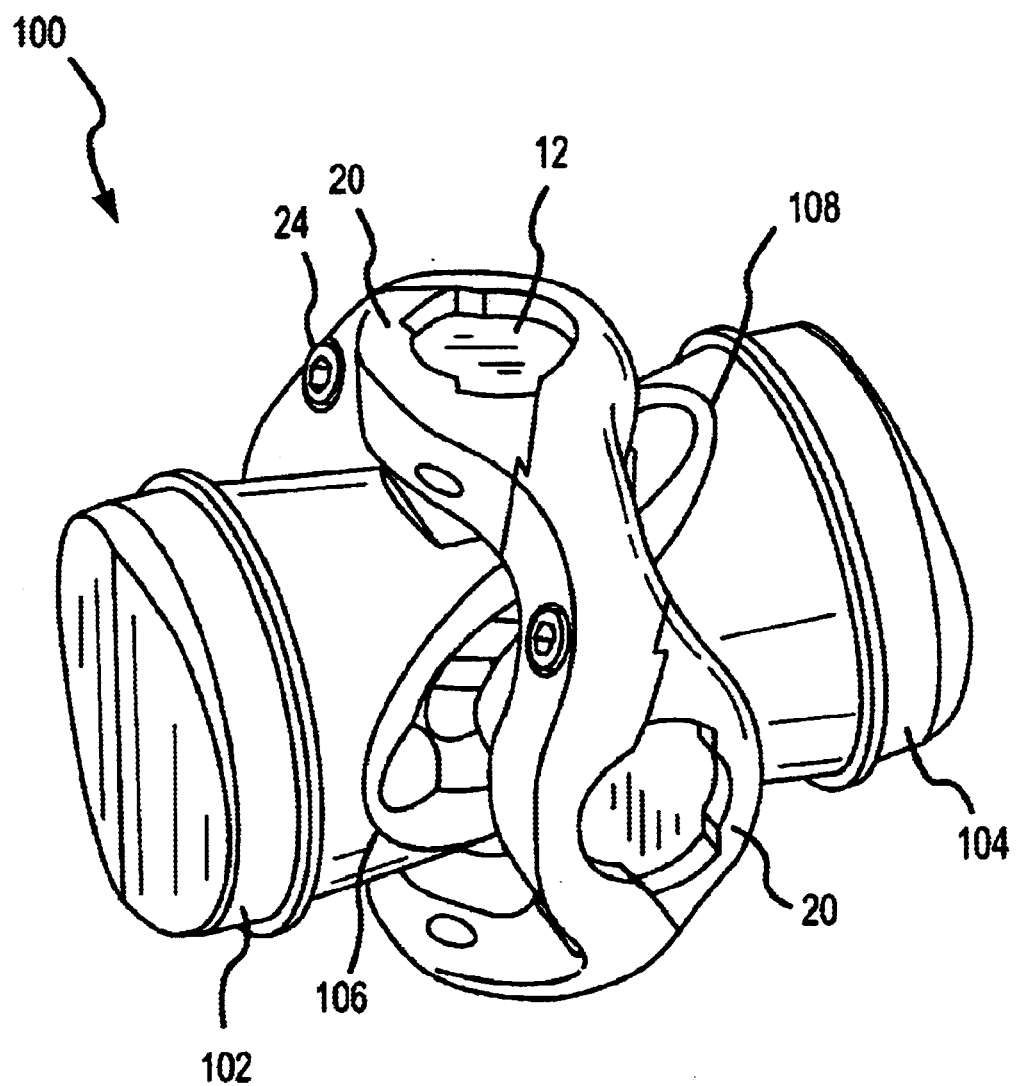
FIG. 3 shows a ring joint assembly.

FIG. 3 shows a perspective view of a ring-joint assembly 100 utilized to interconnect first and second shafts 102, 104. The ring-joint assembly 100 is universal joint assembly that utilizes an external ring 10 to transfer of a rotary torque between the first and second shafts 102, 104. As shown in FIG. 2, each shaft 102, 104 has a yoke 106, 108 attached to their facing ends. The open ends of the yokes 106, 108 are in a facing relationship and rotated 90° relative to one another. The external ring 10 surrounds the yokes 106, 108 and receives torque-transfer elements (trunnions 30) extending radially outward from the yokes 106, 108 (see for example, FIG. 5). Accordingly, the external ring 10 includes four radial bores 12, equally spaced about its circumference for receiving the trunnions 30. In the embodiment shown, a removable retainer 20, in conjunction with the external ring 10, defines each of the four radial bores 12. These retainers 20 are interconnected to the ring 10 utilizing two bolts 24 (i.e. one on either side of the radial bore 12). However, it will be appreciated that the radial bores may be formed entirely within the ring 10.

The trunnions 30 may be integrally formed or fixedly attached to the yokes 106, 108. Alternatively, the trunnions 30 may be formed as separate pins received by both the yokes 106, 108 and the ring 10 (e.g. threaded into the yokes 106, 108 and received within the radial bores 12 of the ring member 10. Furthermore, each torque transfer element will typically include a bearing assembly allowing each opposing pair of torque transfer elements to create a pivotable connection between the ring 10 and the yoke 106, 108. In this regard, a first pair of opposing radial bores 12 defines a first pivot axis with the first shaft 102, while a second pair of the bores 12 defines a second pivot axis with the second shaft 104. As will be appreciated, once the shafts 102, 104 are interconnected via the ring member 10, the shafts 102, 104 have two rotational degrees of freedom relative to one another, thereby allowing the shafts 102, 104 to rotate about non-aligned axes of rotation. Furthermore, due to the geometry of the ring 10, the shafts 102, 104 have a greater allowable range of motion as compared to shafts interconnected with a cruciform type joint 200 as shown in FIG. 2.

Figure 4:
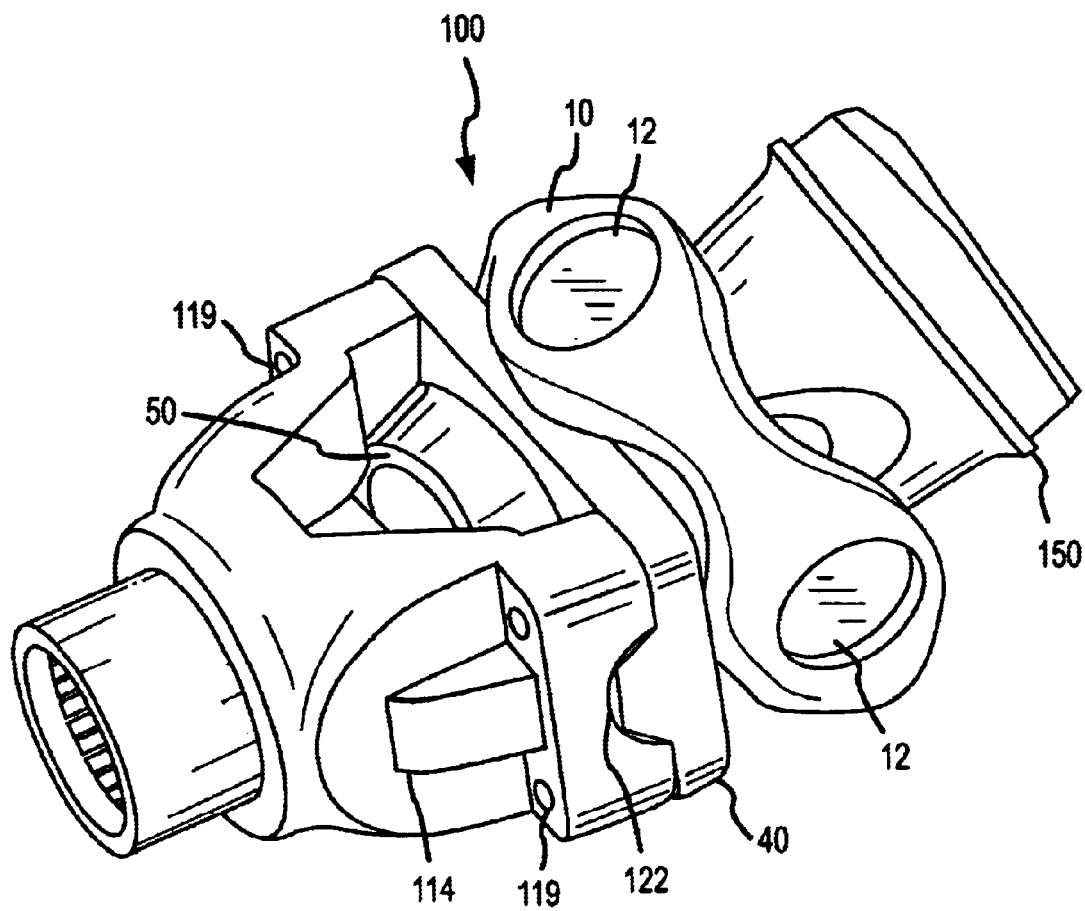
FIG. 4 shows a perspective view of an adapter interconnecting a cruciform yoke to a ring joint assembly.

In order to adapt the yoke 114 on the transmission 110 for use with a ring joint as shown above in FIG. 3, the adapter of FIG. 1 is utilized. FIG. 4 shows the adapter 40 being utilized to connect the cruciform-type yoke 114 to a ring joint assembly 100. The yoke 114 as shown in FIG. 4 is the same yoke 114 as shown in FIG. 2 having been removed from the transmission 110 for illustrative purposes. However, it will be appreciated that the adapter 40 may be utilized with yoke members that are interconnectable to other rotating members. To interconnect the adapter 40 to the yoke 114 the bolts 118, retaining caps 116, and cruciform connector 140 are removed from the yoke 114. The four threaded holes 119 previously utilized to connect the two retaining caps 116 a–b to the yoke 114 are utilized to interconnect the adapter 40 to the yoke 114.

Figure 5:
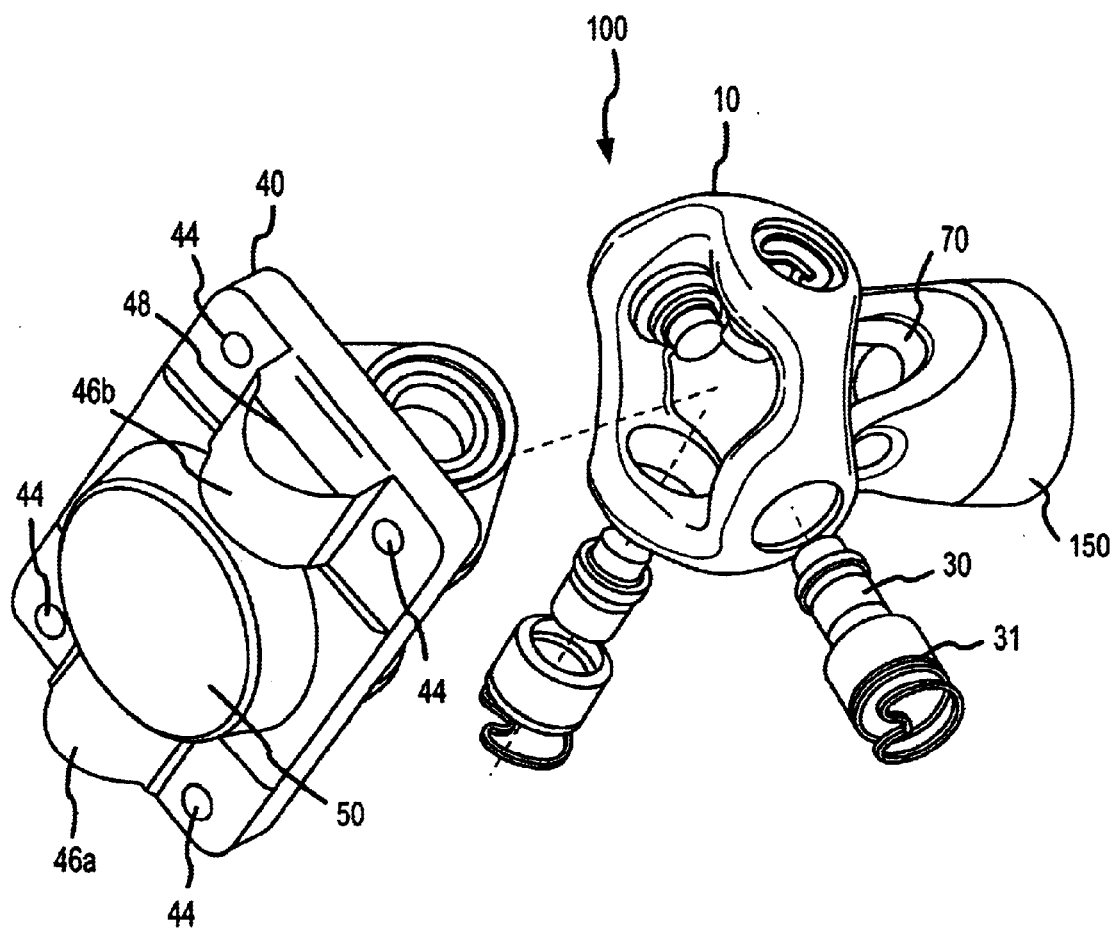
FIG. 5 shows an exploded perspective view of FIG. 3.

As shown in FIGS. 4 and 5, the adapter 40 includes four spaced bolt holes 44 for interconnecting the adapter 40 to the threaded holes 119 in the yoke 114. Further, in the embodiment shown, the adapter 40 includes first and second torque transfer elements 46a–b sized for receipt within the portions of the radial bores 120a–b defined by the yoke 114. As shown, the torque transfer elements 46a–b are integrally formed with the adapter 40. As will be appreciated, the adapter 40 may be formed without the first and second torque transfer elements 46a–b. However, without the torque transfer elements 46a–b, torque transfer between the yoke 114 and the adapter 40 is limited to the sheer strength of the four bolts. In this regard, inclusion of the first and second torque transfer elements 46a–b allows for increased torque transfer between the adapter 40 and the yoke 114.

The torque transfer elements 46a–b are also utilized to align the adapter 40 with the output yoke 114. In this regard, each torque transfer element 46a–b includes an alignment notch 48 (only one of which is shown) for use in centering the adapter 40 with the yoke 114. As shown in FIG. 4, the alignment notch 48 corresponds with a retention tab 122 on the yoke 114.

As shown in FIG. 5, the yoke 114 has been removed to better illustrate the first interface surface 41. This interface surface 41 may be individually designed to engage any number of output yokes. In this regard, it will be appreciated that cruciform connectors and their corresponding yokes are produced in a range of sizes for different applications. Further, a variety of mechanisms exist to interconnect cruciform connectors to cruciform-type yokes. Accordingly, the first interface surface 41 may be formed with any of a variety of differently sized torque transfer elements 46a–b for receipt within a variety of differently sized yokes. Likewise a variety of attachment means may be utilized to interconnect the adapter 40 to the yokes. That is, the first interface of the adapter 40 may be designed to be fixedly attached to any cruciform yoke utilizing any appropriate attachment means, including releasable mechanical fasteners (e.g. bolts) and/or permanent connection (e.g. welding).

Figure 6:
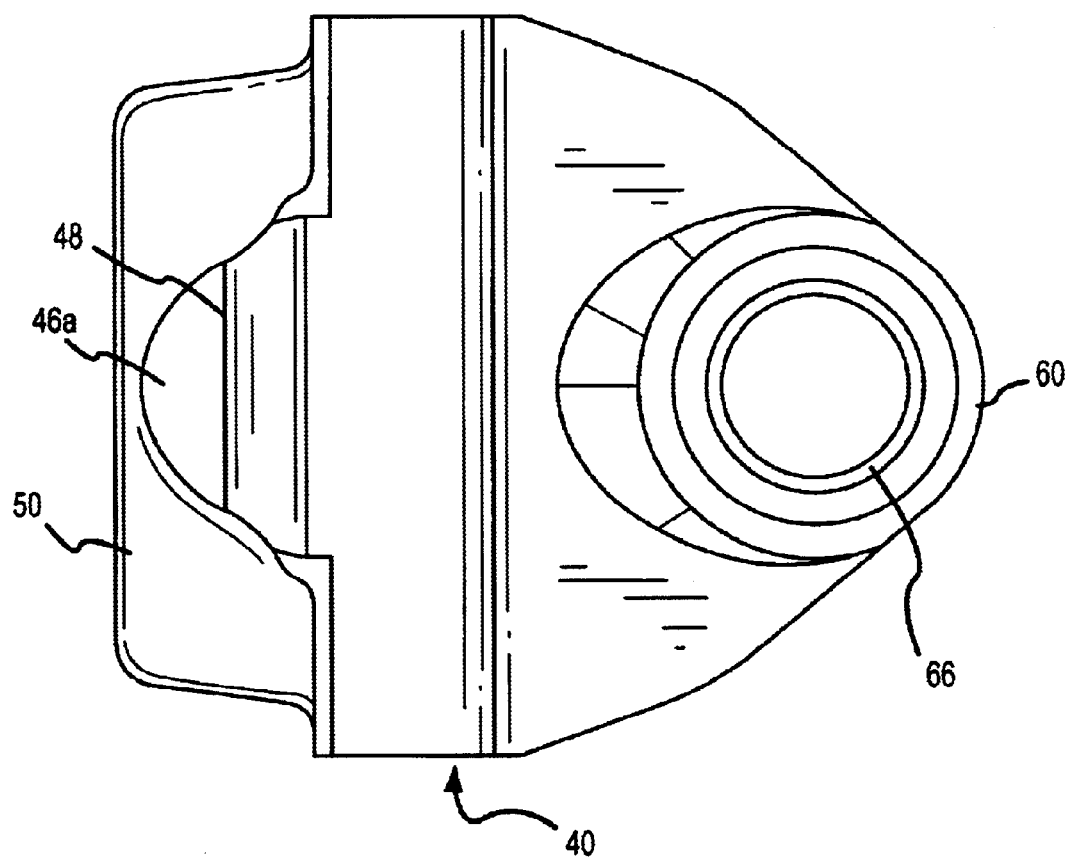
FIG. 6 shows a top view of the adapter of the present invention.

As noted above, the second interface surface 43 of the adapter 40 is interconnectable to a ring 10 of a ring joint assembly 100. FIGS. 1 and 6 show side and top views of the second interface surface 43 of the adapter 40, respectively. As shown in FIG. 1, the second interface surface 43 generally comprises a U-shaped yoke 60 having first and second ears 62, 64 equally spaced about a centerline axis of the adapter 40. This U-shaped yoke member 60 is sized to be received within the aperture of the ring 10 of a ring-joint assembly as shown in FIG. 5.

Each ear 62, 64 of the U-shaped yoke 60 includes a radial bore 66 sized to receive a trunnion 30 and/or bearing assembly (e.g. a bushing) extending inward from the ring 10. See FIG. 5. Though shown as utilizing a radial bore 66 for receiving trunnions extending inward from the ring member 10, it will be appreciated that the U-shaped yoke 60 may also incorporate outwardly extending trunnions that are fixedly interconnected (e.g., welded, threaded, and/or integrally formed) on the first and second ears 60, 62. In this regard, the outwardly extending trunnions are received within opposing radial bores 12 of the ring member 10. In any case, upon interconnection the adapter 40 and ring 10 are pivotally interconnected.

Though the yoke on the end of shaft 150 utilized with the cruciform connector 140 (See FIG. 2) is substantially similar to the yoke 70 on the end of the shaft 150 utilized with the ring connector (See FIG. 5), it will be appreciated that the yoke 70 received within the ring member 10 will typically be considerably smaller than a yoke 130 sized to receive a cruciform connector 140. In this regard, the U-shaped yoke 130 as shown in FIG. 2 may be removed from the shaft 150 and replaced with a smaller yoke 70 as shown in FIG. 5. In this regard, the cruciform member receiving yoke 130 may be cut off of the output shaft 150 and the smaller yoke 70, sized for receipt within a ring member, may be welded in its place. As will be appreciated, this process may be performed in a manner known to those skilled in the art.

Figure 7:
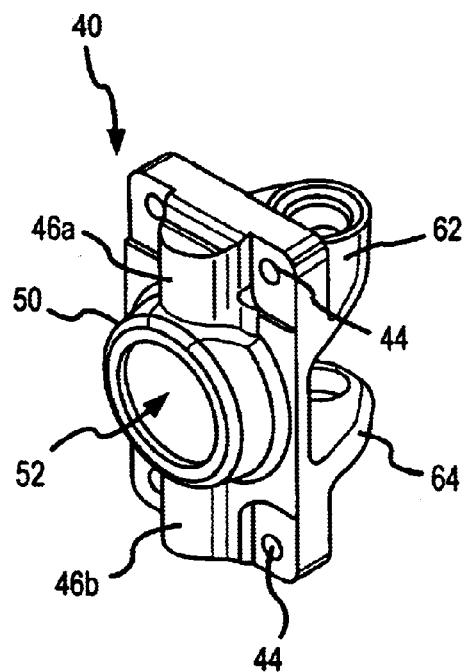
FIG. 7 shows a perspective view of a second embodiment of the adapter of the present invention.
Figure 8:
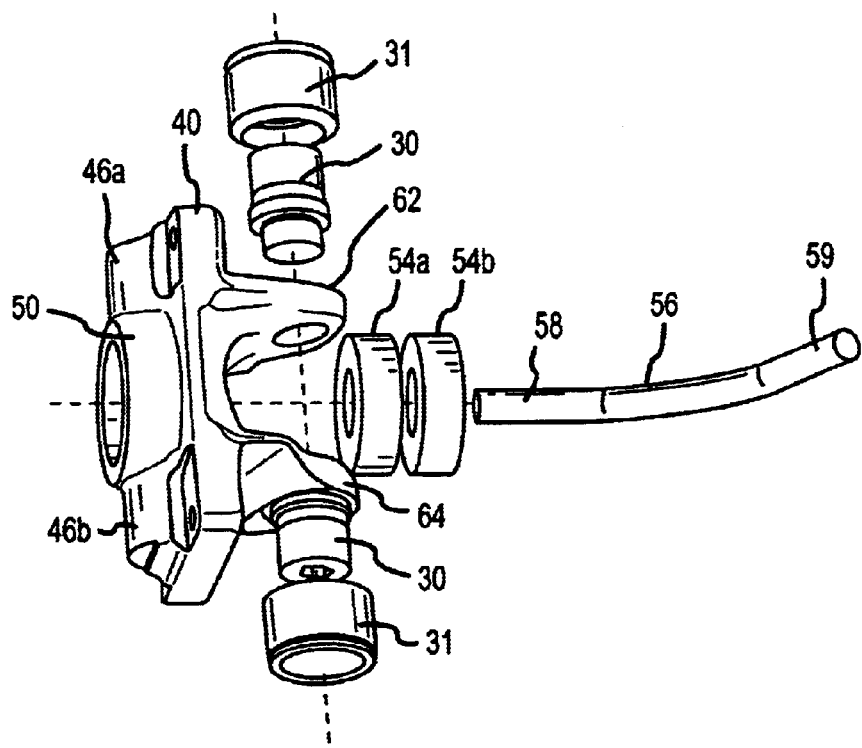
FIG. 8 shows an exploded view of the adapter of FIG. 7 receiving an alignment mechanism.

FIGS. 7 and 8 show an alternate embodiment of the adapter 40, wherein the central bore 52 of the bearing housing 50 extends entirely through the adapter 40. In the embodiment shown, the bore 52 is sized to receive two bearing assemblies 54*a–b*. These bearing assemblies 54*a–b* may be press-fit within the bore 52, or, the bore 52 may further include snap rings and retention grooves (not shown) for retaining the bearing assemblies 54*a–b* within the bore 52. In any case, the bearing assemblies 54*a–b* each include a central aperture (not shown) sized to receive the end of a centering means or rigid fixation system, which extends through the ring member 10 of the ring joint assembly 100. As shown in FIG. 8, a central bar 56 of a rigid fixation system is illustrated that is utilized to maintain first and second rotating members (typically interconnected by a ring type joint) at a constant angle relative to one another. It this regard, the rigid bar 56 has first and second sections 58, 59 designed for receipt within central bores of two connected rotating members. Once the two sections 58, 59 of the rigid bar are received within central bores of the rotating members (i.e., the central bore 50 adapter 40 and a central bore of a rotating member such as a shaft 150) those rotating members will maintain an angle between their rotational axes as defined by the angle between the first and second sections 58, 59.

Referring again to FIG. 5, it is noted that in addition to the two torque transfer elements 46 *a–b*, the first interface surface 41 of the adapter 40 also includes a substantially circular bearing housing 50 disposed between the torque transfer elements 46*a–b*. This core member 50 is sized to be received within the open end of yoke 114 when the adapter 40 is interconnected thereto. See FIG. 4. The bearing housing 50 provides a central structure that allows the adapter 40 to support a centering means or a rigid fixation system within a central bore (see FIG. 8) that maintains the output shaft 150 at a desired angle relative to the output yoke 114. Such a device is illustrated in a co-filed U.S. Patent Application entitled "Rigid Bent Bar Self-Supporting CV Joint", which has not yet been assigned a filing number and is further identified as attorney docket number 50062–00001; the contents of which are incorporated herein as if set forth in full. However, it will be appreciated that the adapter may also be formed without the bearing housing 50.

Though discussed herein as utilizing an adapter to convert a cruciform output yoke of a transmission to yoke adapted for use with a ring joint assembly, it will be appreciated that other adapter embodiments may be utilized. For example, it is common for drive linkages to utilize a carrier (i.e. a short shaft) having a cruciform joint on each end to provide a constant velocity joint and to increase the operating range between an input shaft and an output shaft. That is, some linkages utilize a double cruciform joint assembly. An adapter similar to that discussed above may be utilized with such carriers. In this regard, one or both of the cruciform receiving yokes on the carrier may be adapted for use with a ring-type joint.

What is claimed is:

1. A universal joint adapter, comprising:

a first structure adapted for attachment to an open end of a U-shaped yoke member associated with a rotating member, said yoke member having first and second legs defining said open end, wherein said first and second legs at least partially define first and second opposing radial bores extending outwardly from a rotational axis of said yoke member for receiving a torque transfer element therebetween and wherein said first structure further includes first and second torque transfer elements sized for receipt within at least a portion of said first and second opposing radial bores, respectively; and a second structure adapted for receipt within an aperture of an annular member, said second structure providing a surface adapted for pivotal interconnection with said annular member;

wherein said first and second structures are rigidly interconnected.

2. The adapter of claim 1, wherein said first and second structures are an integrally defined one-piece unit.

3. The adapter of claim 1, wherein said first and second structures define first and second interface surfaces, respectively, wherein said first and second interface surfaces have a common rotational axis.

4. The adapter of claim 3, wherein, upon attachment to said yoke member, said common axis is aligned with a rotational axis of said yoke member.

5. The adapter of claim 1, wherein, said first structure is adapted for fixed attachment to said yoke member, wherein said first structure and said yoke member maintain a fixed spatial relationship during rotation of said yoke member.

6. The adapter of claim 5, wherein said first structure is adapted to fixedly interconnect to said first and second legs.

7. The adapter of claim 1, wherein said first structure is releaseably attachable to said yoke member.

8. The adapter of claim 1, wherein said first and second torque transfer elements are integrally formed on a surface of said first structure.

9. The adapter of claim 1, wherein said first and second torque transfer elements are half cylindrical surfaces for receipt within said first and second opposing radial bores at least partially defined by said yoke member.

10. The adapter of claim 9, wherein said first and second torque transfer elements comprise a unitary piece formed on a surface of said first structure.

11. The adapter of claim 1, wherein said second structure further comprises:

a yoke sized for receipt within said aperture, said yoke extending away from said first interface surface.

12. The adapter of claim 11, wherein said yoke further comprises:

first and second legs equally spaced relative to a rotational axis of said connector, said first and second legs defining an open end of said yoke.

13. The adapter of claim 12, wherein said first and second legs form first and second opposing surfaces for pivotal interconnection with said annular member.

14. The adapter of claim 13, wherein said first and second legs each include an aperture for receiving a pin extending inward from said annular member.

15. The adapter of claim 13, wherein said first and second legs each further comprise:
   a torque transfer element extending outward relative to said rotational axis, said torque transfer element being interconnectable with said annular member.

16. The adapter of claim 1, further comprising:
   a bore aligned with a rotational axis of said adapter and extending through at least a portion of said connector.

17. A universal joint adapter, comprising:
   an annular member defining a central aperture;
   a first member having:
      a first end partially disposed within said aperture and pivotally interconnected to said annular member; and
      a second end adapted for interconnection with a shaft member; and
   a second member having:
      a first end partially disposed within said aperture and pivotally interconnected to said annular member; and
      a second end adapted for fixed attachment to an open end of a U-shaped yoke member having first and second legs that at least partially define first and second opposing radial bores extending outwardly from a rotational axis of said yoke member, wherein said second end of said second member further includes first and second torque transfer elements sized for receipt within at least a portion of said radial bores.

18. The adapter of claim 17, wherein said first and second members are interconnected to said annular member about first and second pivot axes, respectively.

19. The adapter of claim 18, wherein said first and second pivot axes are coplanar.

20. The adapter of claim 19, wherein said pivot axes are perpendicular.

21. The adapter of claim 17, wherein, said second end of said first member is releasably attached to said shaft.

22. The adapter of claim 17, wherein said first and second torque transfer elements are integrally formed on a surface of said second end of said second member.

23. The adapter of claim 22, wherein said torque transfer element is sized for mating receipt within said radial bores.

24. A universal joint adapter for converting a yoke member originally designed to receive a cruciform-type connector of a cruciform-type universal joint into a yoke member that may be utilized with a ring-type universal joint, comprising:
   a first interface surface adapted for fixed interconnection to the open end of a U-shaped yoke member designed to receive a cruciform connector member of a cruciform-type universal joint, wherein said yoke member includes first and second legs that at least partially define first and second opposing radial bores for receiving said cruciform connector member;
   a second interface surface adapted for pivotal interconnection within an aperture of an annular member of a ring-type universal joint; and
   at least one torque transfer element dispose on said first interface surface for receipt within at least a portion of said first and second opposing radial bores.

25. The adapter of claim 24, wherein said torque transfer element is sized for mating receipt within said radial bores.

26. The adapter of claim 24, wherein said second interface surface comprises a yoke member having first and second legs.

27. The adapter of claim 26, wherein each said leg includes an aperture for receiving a pin extending inward from an annular connector member.

* * * * *

UNITED STATES PATENT AND TRADEMARK OFFICE
CERTIFICATE OF CORRECTION

PATENT NO.    : 6,899,630 B2  
DATED         : May 31, 2005  
INVENTOR(S)   : Fisher et al.

Page 1 of 1

It is certified that error appears in the above-identified patent and that said Letters Patent is hereby corrected as shown below:

<u>Title page,</u>
Item [56], References Cited, U.S. PATENT DOCUMENTS, insert
-- 3,662,567 A * 5/1972 Condon et al. ………………….. 464/106 --.

Signed and Sealed this

Sixteenth Day of August, 2005

JON W. DUDAS
*Director of the United States Patent and Trademark Office*